(12) United States Patent
Wang et al.

(10) Patent No.: US 7,876,551 B2
(45) Date of Patent: Jan. 25, 2011

(54) HINGE ASSEMBLY AND COMPUTER HOUSING USING THE SAME

(75) Inventors: Jin-Xin Wang, Shenzhen (CN); Chao-Zhong Fu, Shenzhen (CN); Gui-Li Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 82 days.

(21) Appl. No.: 12/477,264

(22) Filed: Jun. 3, 2009

(65) Prior Publication Data

US 2010/0103601 A1   Apr. 29, 2010

(30) Foreign Application Priority Data

Oct. 29, 2008   (CN) .................... 2008 1 0305271

(51) Int. Cl.
*G06F 1/16* (2006.01)

(52) U.S. Cl. .................... 361/679.02; 248/549; 16/362; 455/566; 312/312

(58) Field of Classification Search ................. 248/371, 248/549, 55, 161, 133, 282.1, 125.9; 16/232, 16/333, 250, 362, 364, 231, 286, 72, 280, 16/340; 361/679.02, 679.27, 679.06, 679.21, 361/679.29, 679.01, 679.15, 679.04, 679.13, 361/679.47, 679.55; 455/575.4, 575.3, 566, 455/575.1; 296/155, 202, 24.34, 3, 37.6, 296/156; 312/326, 286, 265.2, 312, 319.7
See application file for complete search history.

(56) References Cited

U.S. PATENT DOCUMENTS

| 2009/0031531 A1* | 2/2009 | Chang et al. ................. 16/333 |
| 2009/0032668 A1* | 2/2009 | Lin et al. ..................... 248/371 |
| 2010/0064475 A1* | 3/2010 | Wang et al. .................. 16/232 |

* cited by examiner

*Primary Examiner*—Hung V Duong
(74) *Attorney, Agent, or Firm*—Clifford O. Chi

(57) ABSTRACT

A hinge assembly includes a base, a rotating member, and a connecting member connecting the base to the rotating member. The connecting member is slidably positioned on the base. The rotating member is rotatably positioned on the connecting member. The rotating member relative to the connecting member is able to move to be on an outer side of the base with sliding movement of the connecting member relative to the base.

14 Claims, 8 Drawing Sheets

HINGE ASSEMBLY AND COMPUTER HOUSING USING THE SAME

BACKGROUND

1. Technical Field

The present disclosure relates to a hinge assembly and a computer housing the same.

2. Description of the Related Art

A common computer housing includes a rear cover and a front cover. The rear cover includes a base and four sidewalls extending from the base. The base and the four sidewalls cooperatively define an opening. The front cover is attached to a top portion of the four sidewalls to seal the opening and protect electronic components received in the base, such as a motherboard.

Most front covers are fixed to rear covers with screws. A specialized instrument, such as a screwdriver, is required to disengage the front cover from the rear cover. Otherwise, without the specialized instrument, disengaging the front cover from the rear cover is complex and difficult.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure.

DETAILED DESCRIPTION

Figure 1:
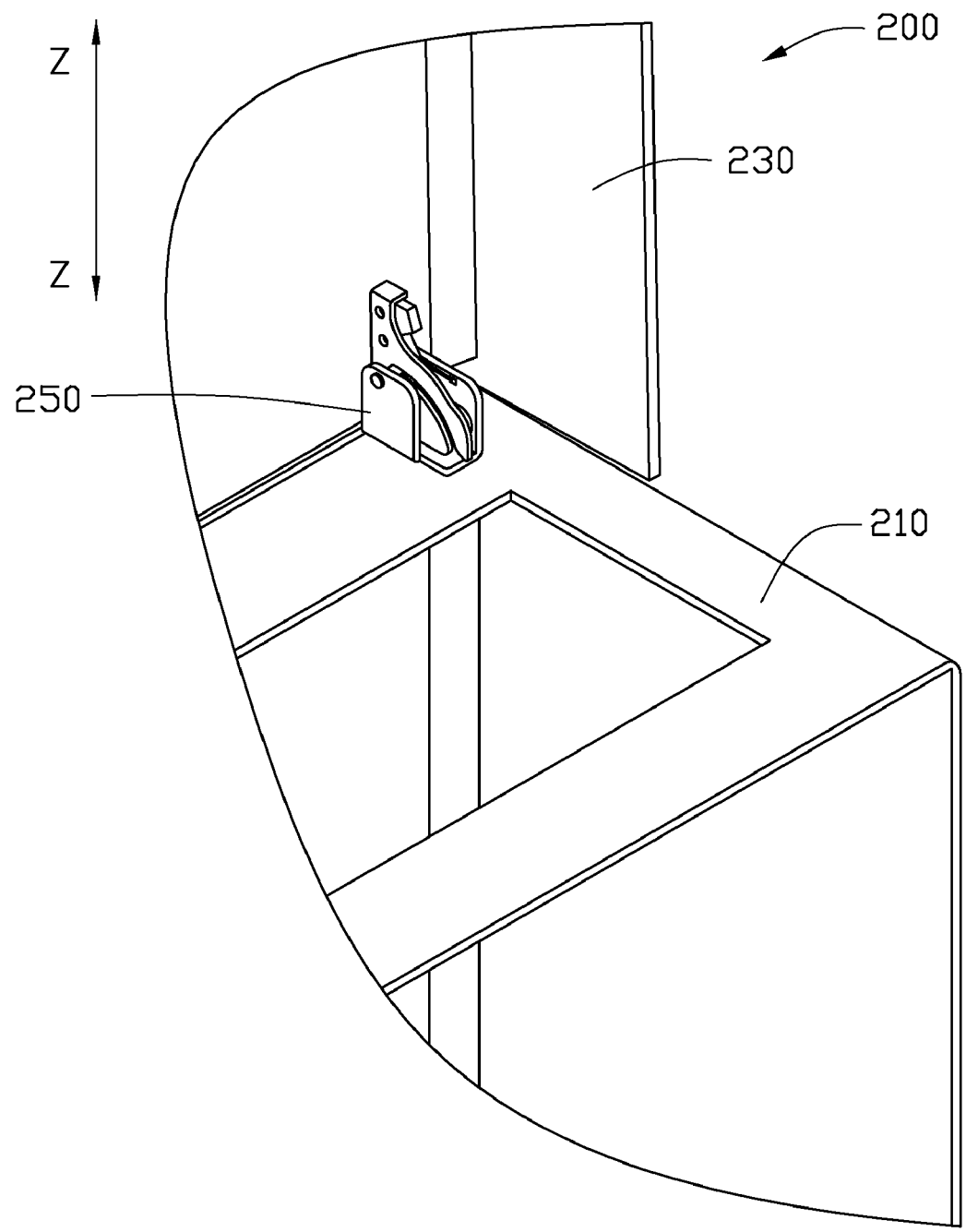
FIG. 1 is an isometric view of an embodiment of a computer housing including a hinge assembly.

Referring to FIG. 1, a computer housing 200 includes a main body 210, a cover 230, and a hinge assembly 250. The hinge assembly 250 rotatably connects the cover 230 to the main body 210.

Figure 2:
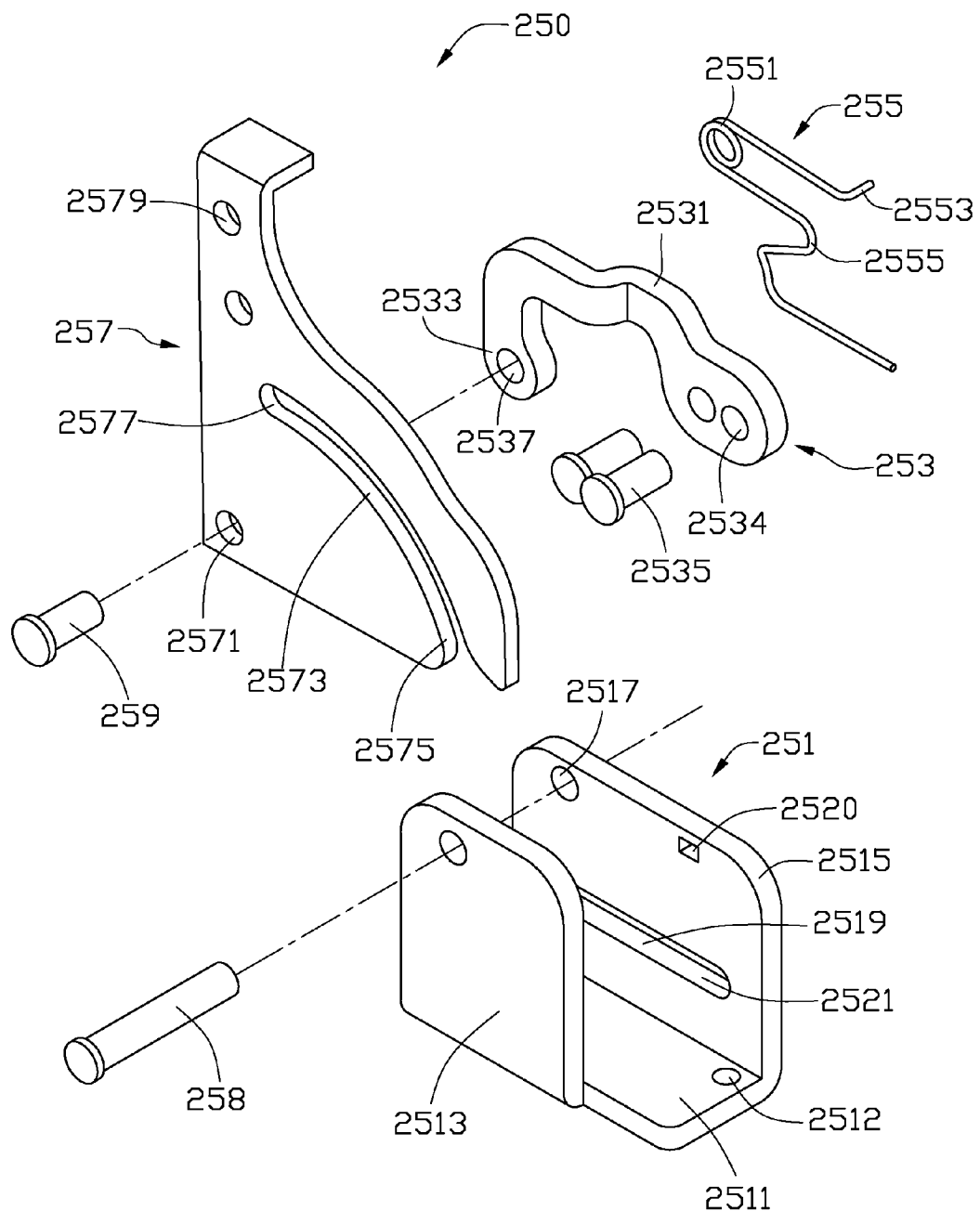
FIG. 2 is an exploded, isometric view of the hinge assembly in FIG. 1.
Figure 3:
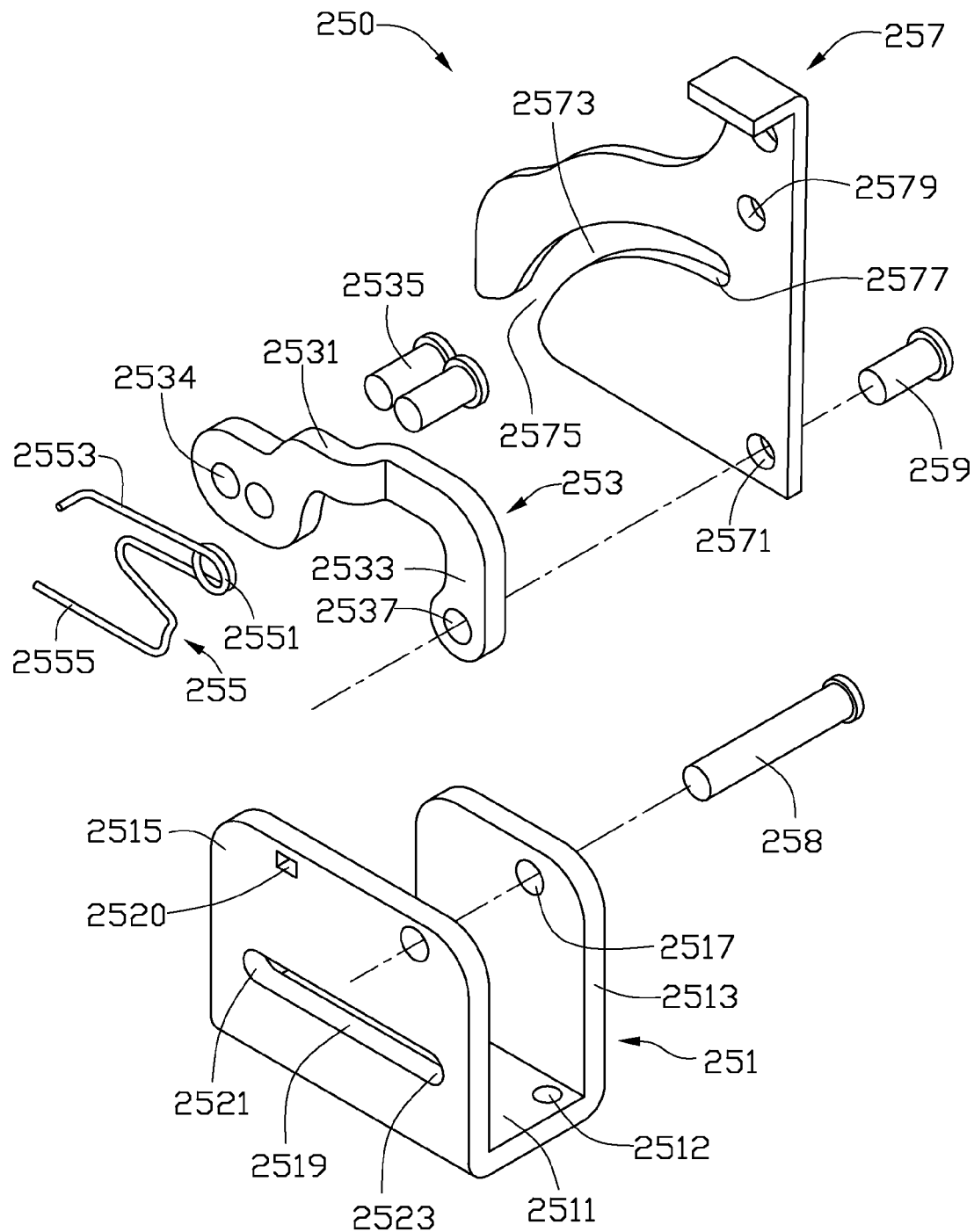
FIG. 3 is similar to FIG. 2, but shown from another aspect.

Referring to FIGS. 2 and 3, the hinge assembly 250 includes a base 251, a connecting member 253, an elastic member 255, a rotating member 257, a guiding member 258, and a pivotal shaft 259.

The base 251 includes a base plate 2511, a first side plate 2513, and a second side plate 2515 opposite to the first side plate 2513. The first side plate 2513 and the second side plate 2515 extend along the same axis from a periphery of the base plate 2511. Both the first side plate 2513 and the second side plate 2515 define a pivotal hole 2517. In addition, the second side plate 2515 defines an elongated sliding slot 2519 adjacent to the base plate 2511. The sliding slot 2519 extends substantially parallel to the base plate 2511. Furthermore, the base plate 2511 defines a plurality of connecting holes 2512, and the second side plate 2515 defines a fixing hole 2520 to fix a portion of the elastic member 255.

The connecting member 253 includes a first support portion 2531 and a second support portion 2533. The first support portion 2531 intersects with the second support portion 2533, and the first support portion 2531 and the second support portion 2533 cooperatively form a substantially L-shaped structure. In the illustrated embodiment, a sliding portion 2535 is formed by such means that two fasteners are received in two fixing holes 2534 defined in the first support portion 2531. An end, away from the first support portion 2531, of the second support portion 2533 defines a receiving hole 2537. An extending direction of the receiving hole 2537 is substantially perpendicular to the first support portion 2531 and the second support portion 2533.

The elastic member 255 is a torsion spring. The elastic member 255 includes a spring coil 2551 and two connecting pins 2553, 2555 extending from the spring coil 2551.

The rotating member 257 includes a small end and a large end. The rotating member 257 defines a pivotal hole 2571 in the small end and a curved slot 2573 in the large end. Furthermore, a center of the arc defined by the curved slot 2573 substantially aligns with a center of the pivotal hole 2571. The curved slot 2573 includes an open end 2575 and a closed end 2577. In addition, the rotating member 257 further defines a plurality of connecting holes 2579.

Figure 4:
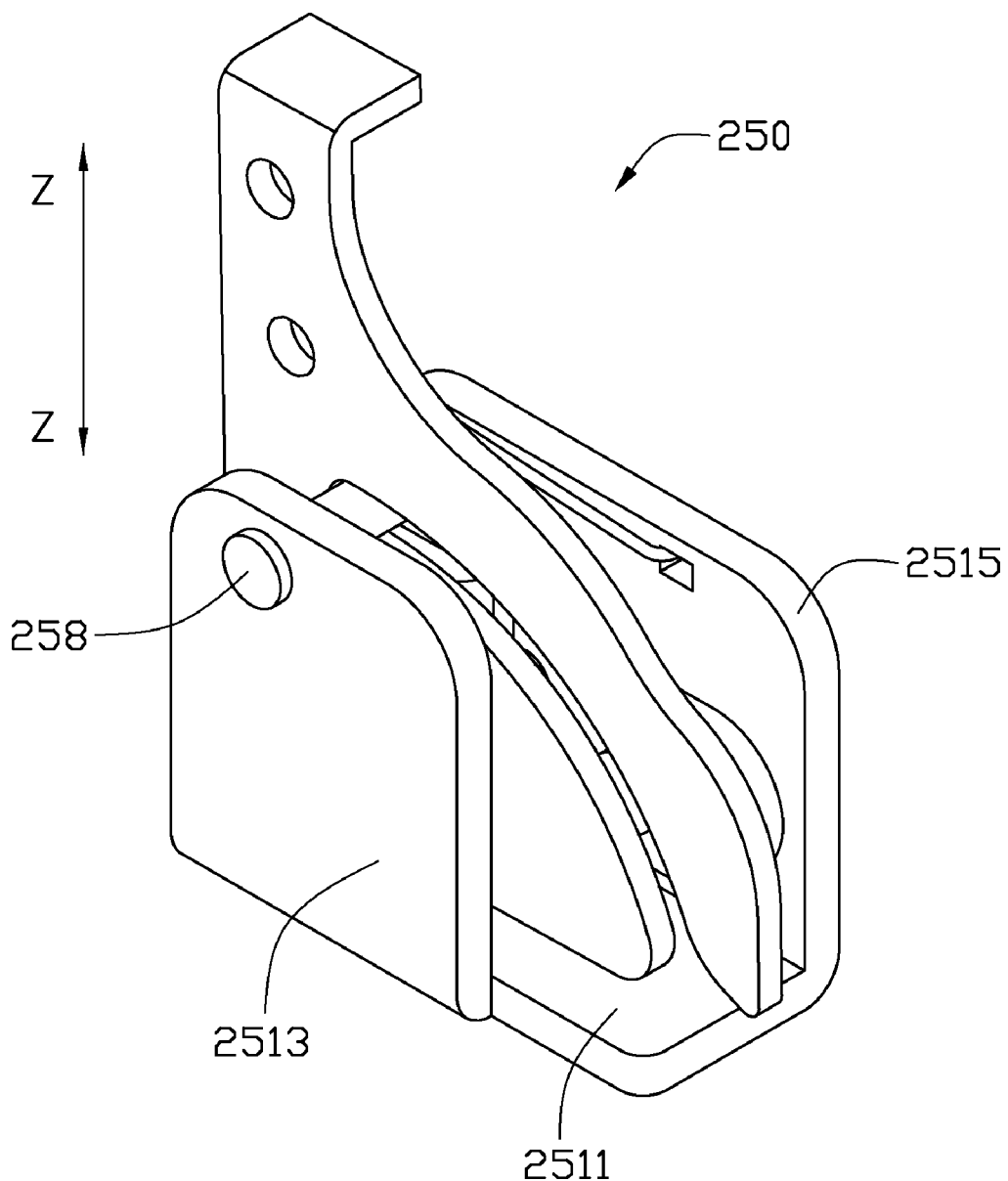
FIG. 4 is an isometric view of the hinge assembly in FIG. 2 after assembly.
Figure 5:
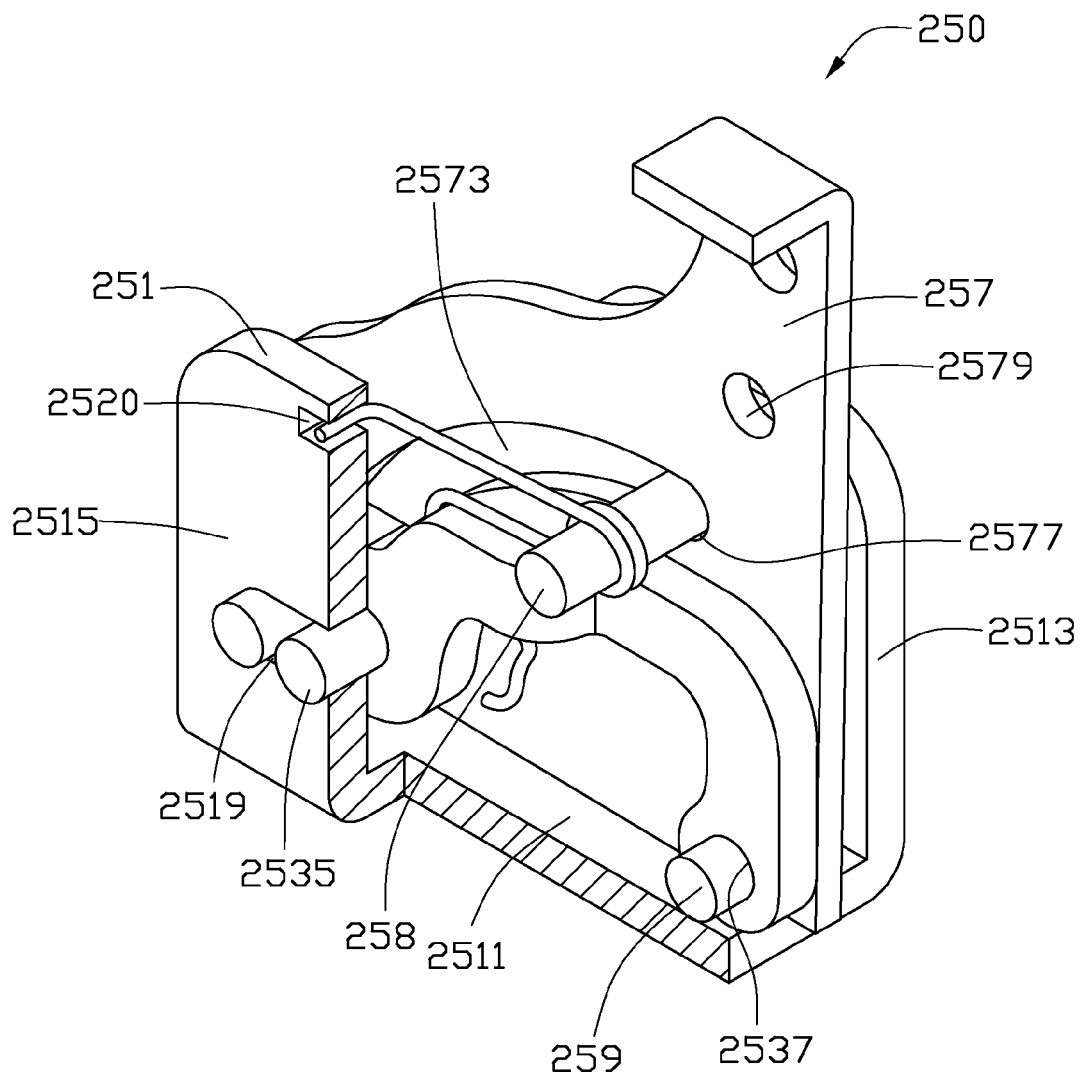
FIG. 5 is similar to FIG. 4, but showing a partial portion from another aspect.

Referring to FIGS. 4 and 5, during assembly of the computer housing 200, the sliding portion 2535 is positioned in the sliding slot 2519 such that the connecting member 253 is slidable relative to the base 251 along the sliding slot 2519.

The pivotal shaft 259 passes through the pivotal hole 2571 and the receiving hole 2537 in that order such that the rotating member 257 is rotatably positioned on the connecting member 253.

One connecting pin 2553 is received in the fixing hole 2520 and the other connecting pin 2555 is fixed on the connecting member 253, and the spring coil 2551 is substantially aligned with the pivotal hole 2517. The rotating member 257 is rotated such that the curved slot 2573 is substantially aligned with the pivotal hole 2517 of the base 251, then the guiding member 258 is received in the pivotal hole 2517, the spring coil 2551, and the curved slot 2573. Thus, when the connecting member 253 slides relative to the base 251 along the elongated sliding slot 2519, a sidewall of the curved slot 2573 pushes the guiding member 258 and the guiding member 258 drives the rotating member 257 to rotate. In other words, when the connecting member 253 slides relative to the base 251 along the elongated sliding slot 2519, the rotating member 257 rotates relative to the connecting member 253 and the base 251. In addition, once the connecting member 253 slides, the elastic member 255 pulls the connecting member 253 such that the connecting member 253 is biased towards returning to its original position.

The base 251 is fixed on the main body 210 by fasteners (not shown) received in the connecting holes 2512, and the rotating member 257 is fixed on the cover 230 by fasteners (not shown) received in the connecting holes 2579 in such a manner that the hinge assembly 250 is inside of the cover 230. To close the cover 230, the sliding portion 2535 slides to the first end 2521 of the elongated sliding slot 2519, the guiding member 258 slides to the closed end 2577 of the curved slot 2573.

Figure 6:
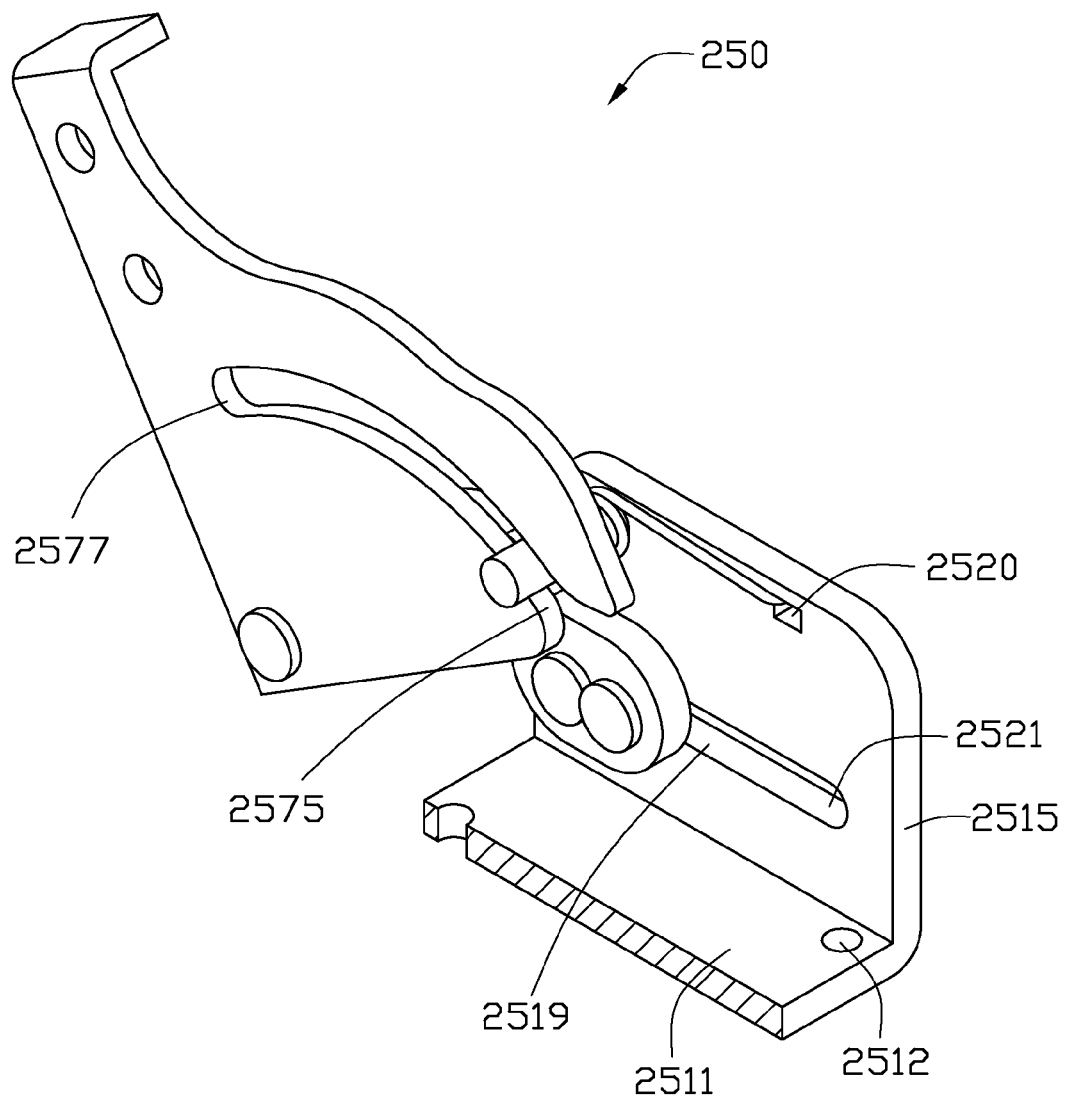
FIG. 6 is an isometric view of the hinge assembly in a first state when opening the computer housing.
Figure 7:
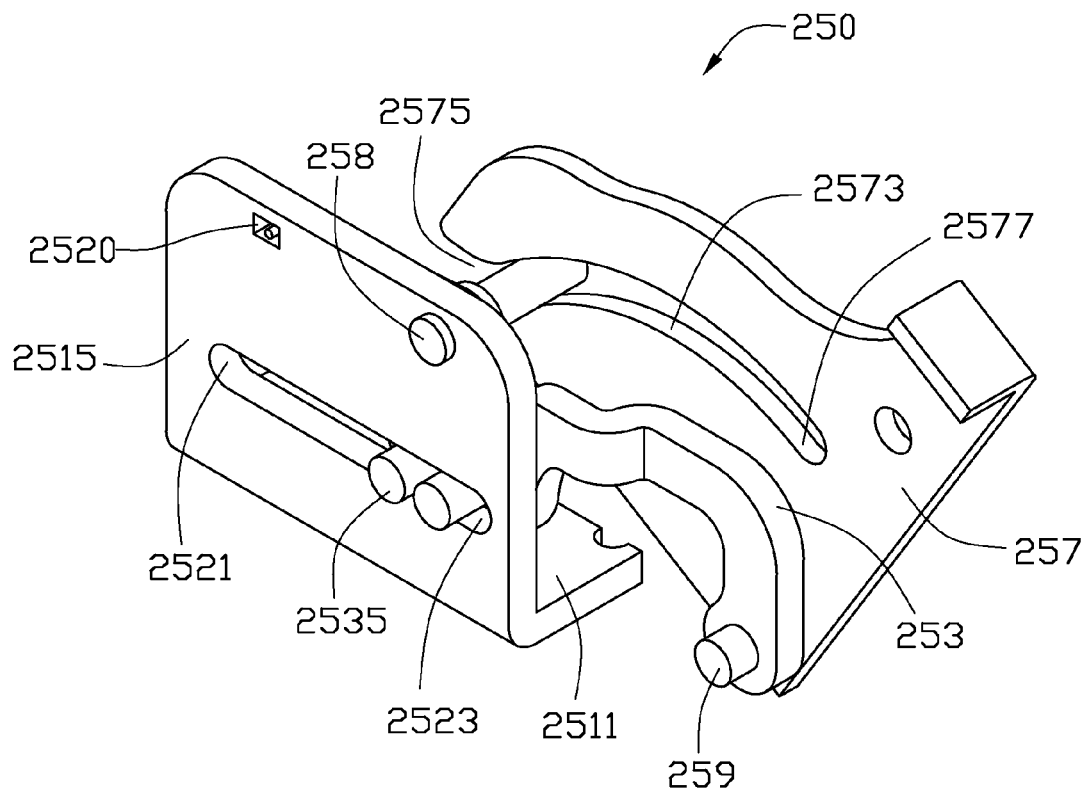
FIG. 7 is similar to FIG. 6, but shown from another aspect.

Also referring to FIGS. 6 and 7, to open the cover 230, the sliding portion 2535 slides towards the second end 2523, the guiding member 258 and the curved slot 2573 constrain each other such that the rotating member 257 rotates relative to the connecting member 253 and the base 251, simultaneously, the guiding member 258 slides in the curved slot 2573 and the guiding member 258 moves towards the open end 2575.

After the sliding portion 2535 reaches the second end 2523, the rotating member 257 is almost on an outer side of the base 251. When the guiding member 258 slides out of the open end 2575, the rotating member 257 just rotates over the vertical line ZZ and is not constrained by a side surface of the main body 210. Then the rotating member 257 continues to rotate due to gravity. Therefore, the cover 230 can be rotated 270° or more. The cover 230 clings to a surface of the main body 210, so a small space is defined by the cover 230 and the main body 210.

Figure 8:
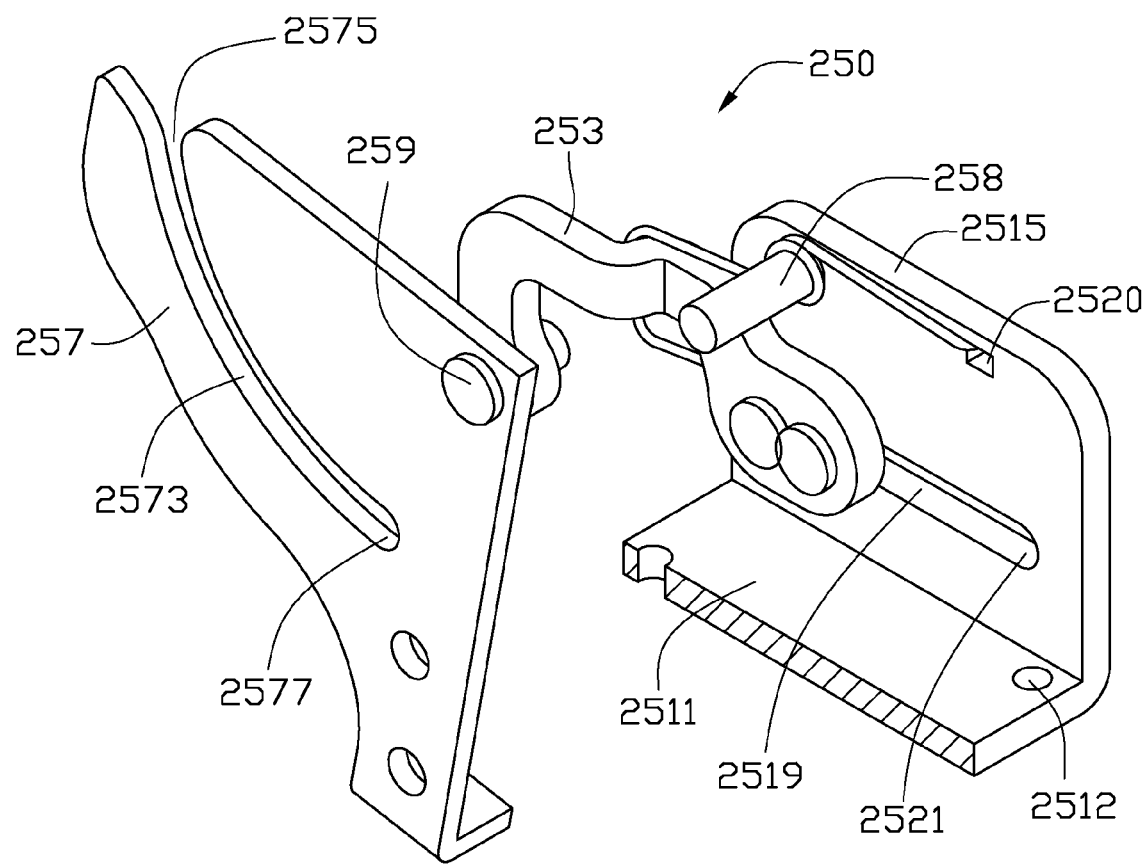
FIG. 8 is an isometric view of the hinge assembly in a second state after the computer housing is open.

Also referring FIG. 8, after the rotating member 257 resists a side of the base plate 2511 of the base 251 or the main body 210, the rotating member 257 stops rotating, simultaneously, the cover 230 is opened completely and unable to move along a open direction continuously.

When the cover 230 is to be closed, external force applied on the cover 230 rotates the cover 230, and the cover 230 rotates the rotating member 257 relative to the connecting member 253 and the base 251.

After the cover 230 rotates over the vertical line ZZ, the open end 2575 of the curved slot 2573 is aligned with the guiding member 258. When the cover 230 rotates continuously, the guiding member 258 enters into the curved slot 2573 from the open end 2575. After that the rotating member 257 drives the connecting member 253 such that the sliding portion 2535 of the connecting member 253 slides along the elongated sliding slot 2519 towards the first end 2521 of the elongated sliding slot 2519. When the sliding portion 2535 slides to the first end 2521 of the elongated sliding slot 2519, the guiding member 258 is on the closed end 2577 of the curved slot 2573, the cover 230 is closed.

Here, the hinge assembly 250 is positioned in a space defined by the cover 230 and the main body 210 so as to be hidden from view outside the computer housing 200 when the cover 230 is closed.

The sliding portion 2535 may be easily received in the elongated sliding slot 2519 because the sliding portion 2535 of the connecting member 253 is formed by two fasteners. It can be understood that the elongated sliding slot 2519 can be replaced by other configuration such as a guiding rail. In addition, the base 251 and the connecting member 253 may be connected by other means, for example the sliding portion 2535 replaced by a cylindrical protrusion integrally formed with the connecting member 253. Similarly, the guiding member 258 may be replaced by a cylindrical protrusion formed on the base 251.

It can be understood that the curved slot 2573 and the guiding member 258 may be omitted in consideration of cost. In this configuration, to open the cover 230, the connecting member 253 is driven to slide relative to the base 251 firstly, after the rotating member 257 is almost on an outer side of base 251, the rotating member 257 is rotated relative to the connecting member 253, thus open the cover 230.

It can be understood that the hinge assembly 250 may be employed in media, a fax machine, a printer, windows, automobile, or building. The cover 230 may be replaced by other member.

Finally, while various embodiments have been described and illustrated, the embodiments are not to be construed as being limited thereto. Various modifications can be made to the embodiments by those skilled in the art without departing from the true spirit and scope of the embodiments as defined by the appended claims.

What is claimed is:

1. A hinge assembly comprising:
   a base;
   a rotating member; and
   a connecting member connecting the base to the rotating member, wherein the connecting member is slidably positioned on the base and the rotating member is rotatably positioned on the connecting member; the rotating member is able to move to an outer side of the base with a sliding movement of the connecting member relative to the base.

2. The hinge assembly of claim 1, further comprising a guiding member positioned on the base, wherein the rotating member defines a curved slot in which the guiding member is received, and when the guiding member is in the curved slot and the connecting member slides relative to the base, the guiding member and the curved slot constrain each other so that the rotating member rotates relative to the base and the connecting member.

3. The hinge assembly of claim 2, wherein the curved slot comprises an open end and a closed end, and the guiding member is able to slide out of the open end.

4. The hinge assembly of claim 3, wherein the rotating member comprises a small end and a large end, in which the curved slot is defined.

5. The hinge assembly of claim 4, further comprising a pivotal shaft, wherein the rotating member defines a pivotal hole in the small end, a center of the pivotal hole substantially aligns with a center of an arc defined by the curved slot; the pivotal shaft passes through the pivotal hole and the curved slot, so that the rotating member is rotatable relative to the base and the connecting member.

6. The hinge assembly of claim 5, wherein the base defines an elongated sliding slot; the connecting member forms a sliding portion; the sliding portion is slidably positioned in the sliding slot of the base.

7. The hinge assembly of claim 6, wherein the connecting member comprises a first support portion and a second support portion intersecting with the first support portion; the first support portion and the second support portion cooperatively form a substantially L-shaped structure; an end, away from the second support portion, of the first support portion forms the sliding portion; and the pivotal shaft is positioned on an end, away from the first support portion, of the second support portion.

8. The hinge assembly of claim 7, further comprising two fasteners, wherein the first support portion defines two fixing holes, the sliding portion is formed by two fasteners received in the fixing holes.

9. The hinge assembly of claim 6, wherein the base comprises a base plate, a first side plate, and a second side plate opposite to the first side plate; the first side plate and the second side plate extend along the same axis from a periphery of the base plate, and both the first side plate and the second side plate define a pivotal hole, with the guiding member fixed in the pivotal holes of the base.

10. The hinge assembly of claim 9, wherein the sliding slot is defined in the second side plate.

11. The hinge assembly of claim 10, wherein the sliding slot extends substantially parallel to the base plate.

12. The hinge assembly of claim 10, wherein the base plate defines a plurality of connecting holes.

13. The hinge assembly of claim 10, further comprising an elastic member, wherein the second side plate defines a fixing hole to fix the elastic member; the elastic member biases the connecting member to return to its original position after the connecting member slides.

14. A computer housing comprising:
   a main body;
   a cover; and
   a hinge assembly connecting the main body to the cover, the hinge assembly comprising:
      a base; and
      a rotating member,
      a connecting member connecting the base to the rotating member, wherein the base is fixed on the main body, the rotating member is fixed on the cover, the connecting member is slidably positioned on the base, the rotating member is rotatably positioned on the connecting member, the rotating member is able to move to be on an outer side of the base with sliding movement of the connecting member relative to the base.

* * * * *